Apr. 24, 1923.
G. P. NORDSTROM
1,453,054
FALSE BOTTOM FOR COOKING UTENSILS
Filed Nov. 28, 1921
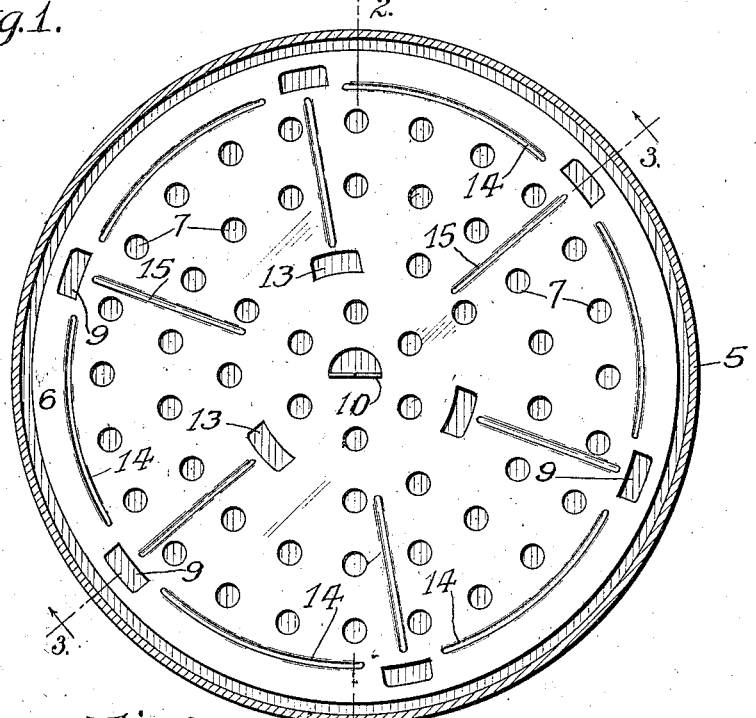
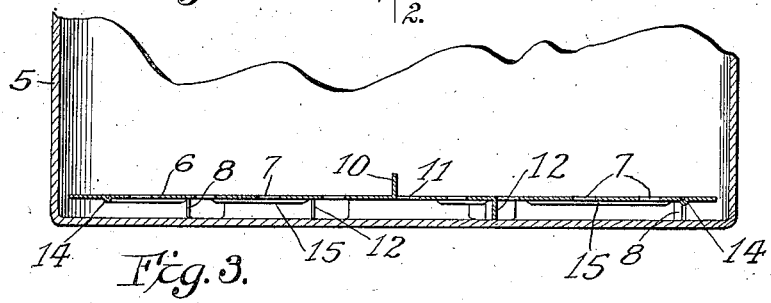
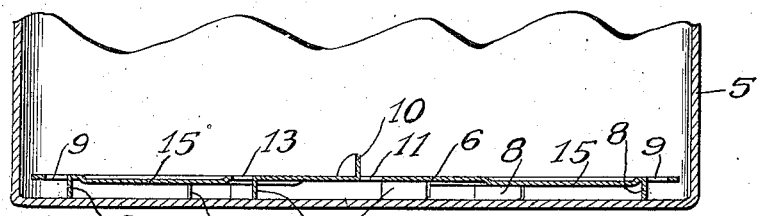
Witness
Erwin C. Lange
Inventor
Gustave P. Nordstrom
By Chas. C. Tillman
Atty.

Patented Apr. 24, 1923.

1,453,054

UNITED STATES PATENT OFFICE.

GUSTAVE P. NORDSTROM, OF CHICAGO, ILLINOIS.

FALSE BOTTOM FOR COOKING UTENSILS.

Application filed November 28, 1921. Serial No. 518,118.

*To all whom it may concern:*

Be it known that I, GUSTAVE P. NORDSTROM, a citizen of the United States, and a resident of Chicago, county of Cook, and State of Illinois, have invented certain new and useful Improvements in False Bottoms for Cooking Utensils, of which the following is a specification.

This invention relates to certain new and useful improvements in an attachment for culinary vessels, or cooking utensils, and is more particularly intended for use in connection with kettles, pans and the like, for the purpose of furnishing simple and efficient means to prevent the articles of food cooked in said vessels burning, being scorched or sticking to the vessels, and it consists in certain peculiarities of the construction, novel arrangement and combination of the various parts therof as will be hereinafter more fully set forth and specifically claimed.

One of the objects of the invention, is to provide out of a single piece of material a perforated false bottom for cooking utensils of such construction and arrangement of its parts that it can be readily placed in a vessel and supported therein at a distance from the bottom of the vessel, to the end, that the article of food being cooked therein will be held out of contact with its bottom, thereby avoiding the possibility of the article being burned or scorched and besides affording means for free circulation of the liquid in the vessel.

Another object of the invention is the provision of a device of the above mentioned character which can be easily removed from the vessel in which it may be used, and which shall be of such construction as to be easily cleaned, strong, durable and inexpensive to manufacture.

Other objects and advantages of the invention will be disclosed in the following description and explanation.

In the accompanying drawing, which serves to illustrate an embodiment of the invention—

Fig. 1 is a plan view partly in section showing the attachment or false bottom for cooking utensils located within a vessel such as a kettle or pan and supported on the bottom thereof in operative position.

Fig. 2 is a central vertical sectional view of a part of the vessel showing my improved device in operative position on the bottom thereof, the said section being taken on line 2—2 of Fig. 1, looking in the direction indicated by the arrows, and Fig. 3 is a similar view of like parts to Fig. 2 taken on line 3—3 of Fig. 1 looking in the direction indicated by the arrows.

Like numerals of reference refer to corresponding parts throughout the different views of the drawing.

The reference numeral 5 designates a cooking utensil such as a kettle, stew pan, or the like, on the bottom of which my attachment is designed to rest and be supported thereon at a distance from said bottom. The attachment consists of a plate which is designated as a whole by the reference numeral 6, of any suitable material but by preference of aluminum. This plate can be made of any desired form in outline, but by preference is circular in shape as shown in the drawing, and is provided with a plurality of perforations 7 of any suitable size, which perforations are preferably arranged in concentric rows as is clearly shown in Fig. 1 of the drawing.

Near its edge or periphery the plate 6 is provided with a plurality of depending legs 8 which are stamped or punched out of the metal plate 6, thus providing openings 9 near the edge of the plate in addition to the perforations 7 above mentioned. At its center the plate 6 is provided with an upwardly extended lip 10 which is punched or stamped out of said plate and affords a handle or thumb-piece which may be engaged by the thumb and fore-finger of one hand in order to lift or remove the device from the vessel or utensil. Besides, the opening 11 produced by punching out the member 10, affords means for the insertion of an instrument to be used for lifting the device from the kettle when the same is very hot.

Located at equal distances apart near the central member 10 are depending legs 12 which are stamped out of the plate 6 and provide openings therein. These legs 12 furnish supports for the central portion of the plate or device, which is quite necessary when the plate is of considerable diameter, to prevent downward depression thereof by reason of the weight of the article being cooked in the vessel. Located on one surface of the plate 6 near the periphery thereof, are a series of segmental ribs 14 which are stamped from the plate and are spaced apart at their ends as shown. Extended radially on the plate are a series of ribs 15 which as shown in Fig. 1 of the drawing have their outer ends located between the adjacent ends of the ribs 14. The ribs 14 and 15 are employed mainly for strengthening the plate, and are by preference depressed therefrom so as to lie on the lower surface of the plate, but if desired, they may be located on the upper surface of the same.

From the foregoing and by reference to the drawing, it will be readily understood and clearly seen that by my improvements, I provide a unitary device which can be manufactured at little cost and is of such a character that it can be readily inserted into a vessel or removed therefrom and easily cleaned, thus providing a sanitary and useful article.

Having thus fully described my invention, what I claim as new and desire to secure by Letters Patent is—

A device of the class described consisting of a circular perforated flat plate having near its periphery a plurality of spaced depending legs punched therefrom and near its center a plurality of spaced depending legs punched therefrom, the said legs intersecting radial lines extended from the center of the plate and presenting one of their faces towards said center, the said legs adapted to rest on the bottom of a vessel for supporting the plate thereon at a distance therefrom, said plate also having near its periphery a plurality of spaced segmental ribs punched downwardly therefrom and located one between each pair of said peripheral legs, said plate also having a plurality of radially disposed ribs punched downwardly therefrom and centrally with an upwardly extended lip punched from the plate to provide means for removing the same from a vessel.

GUSTAVE P. NORDSTROM.